United States Patent
Yeo et al.

(10) Patent No.: US 10,063,099 B2
(45) Date of Patent: Aug. 28, 2018

(54) WIRELESS POWER RECEIVER FOR CONTROLLING WIRELESS POWER BY USING SWITCH

(75) Inventors: Sung-Ku Yeo, Gyeonggi-do (KR); Gyu-Hyeong Cho, Daejeon (KR); Se-Ho Park, Gyeonggi-do (KR); Se-Ki Kim, Jeollabuk-do (KR); Young-Min Lee, Gyeonggi-do (KR); Jun-Han Choi, Daejeon (KR)

(73) Assignees: Samsung Electronics Co., Ltd (KR); Korea Advanced Institute of Science and Technology (KAIST) (KR)

( * ) Notice: Subject to any disclaimer, the term of this patent is extended or adjusted under 35 U.S.C. 154(b) by 1084 days.

(21) Appl. No.: 13/588,609

(22) Filed: Aug. 17, 2012

(65) Prior Publication Data

US 2013/0043737 A1  Feb. 21, 2013

(30) Foreign Application Priority Data

Aug. 19, 2011 (KR) .................. 10-2011-0083072

(51) Int. Cl.
*H02J 17/00* (2006.01)
*H02J 50/12* (2016.01)
*H02J 50/80* (2016.01)
*H02J 7/02* (2016.01)

(52) U.S. Cl.
CPC .............. *H02J 50/12* (2016.02); *H02J 7/025* (2013.01); *H02J 17/00* (2013.01); *H02J 50/80* (2016.02)

(58) Field of Classification Search
CPC . H01F 38/14; H02J 5/005; H02J 17/00; H02J 7/025; B60L 11/182
See application file for complete search history.

(56) References Cited

U.S. PATENT DOCUMENTS

| | | | | |
|---|---|---|---|---|
| 8,035,255 B2* | 10/2011 | Kurs | ...................... | B60L 11/007 307/104 |
| 2005/0068019 A1* | 3/2005 | Nakamura | ................ | G06F 1/26 323/355 |
| 2005/0221790 A1* | 10/2005 | Persico | ................ | H04B 1/1615 455/343.2 |

(Continued)

FOREIGN PATENT DOCUMENTS

KR  1020090056545  6/2009

OTHER PUBLICATIONS

Korean Office Action dated May 19, 2017 issued in counterpart application No. 10-2011-0083072, 13 pages.

*Primary Examiner* — Elim Ortiz
(74) *Attorney, Agent, or Firm* — The Farrell Law Firm, P.C.

(57) ABSTRACT

A wireless power receiver for wirelessly receiving a supply of power from a wireless power supplier is disclosed. The wireless power receiver includes a power reception unit for wirelessly receiving wireless power from the wireless power supplier; a rectifier for rectifying the wireless power into power including a DC waveform; a power adjustor for configuring a closed loop with the power reception unit for a first period and transferring the wireless power to the rectifier for a second period to adjust a size of the wireless power; and a controller for determining the first period and the second period, wherein the power adjustor is electrically connected to the power reception unit and the rectifier.

22 Claims, 9 Drawing Sheets

(56) References Cited

U.S. PATENT DOCUMENTS

| | | | |
|---|---|---|---|
| 2007/0145830 A1* | 6/2007 | Lee | H02J 5/005 307/135 |
| 2007/0246546 A1* | 10/2007 | Yoshida | G06K 7/0008 235/492 |
| 2009/0021219 A1* | 1/2009 | Yoda | H02J 7/0011 320/137 |
| 2009/0127937 A1* | 5/2009 | Widmer | H02J 5/005 307/149 |
| 2010/0109445 A1 | 5/2010 | Kurs et al. | |
| 2010/0164295 A1 | 7/2010 | Ichikawa et al. | |
| 2010/0194206 A1* | 8/2010 | Burdo | G06F 1/266 307/104 |
| 2011/0053500 A1* | 3/2011 | Menegoli | H04B 5/0037 455/41.1 |
| 2011/0115431 A1 | 5/2011 | Dunworth et al. | |
| 2012/0293008 A1* | 11/2012 | Park | H02M 1/14 307/104 |
| 2013/0015813 A1* | 1/2013 | Kim | H02J 7/00 320/108 |

* cited by examiner

WIRELESS POWER RECEIVER FOR CONTROLLING WIRELESS POWER BY USING SWITCH

PRIORITY

This application claims priority under 35 U.S.C. § 119(a) to an application filed in the Korean Intellectual Property Office on Aug. 19, 2011 and assigned Serial No. 10-2011-0083072, the entire disclosure of which is incorporated herein by reference.

BACKGROUND OF THE INVENTION

1. Field of the Invention

The present invention relates generally to a wireless power receiver, and more particularly to a wireless power receiver for wirelessly receiving power based on an electromagnetic resonance technique.

2. Description of the Related Art

Mobile terminals such as mobile phones, a Personal Digital Assistant (PDA), etc., are powered by rechargeable batteries, and the battery of the mobile terminal is charged through electrical energy by using a charging apparatus. Generally, a separate contact terminal is located outside of the charging apparatus and the battery, and the charging apparatus and the battery are electrically connected to each other through contact between them.

However, since the contact terminal protrudes outwardly in such a contact type charging scheme, the contact terminal is easily contaminated by foreign substances and thus the battery charging is not correctly performed. Further, battery charging may not be correctly performed in the case in which the contact terminal is exposed to moisture.

Recently, a wireless charging (non-contact) technology has been developed and used for electronic devices to solve the above-mentioned problems.

Such a wireless charging technology employs wireless power transmission/reception, and includes a system in which a battery is automatically charged if the battery is laid on a charging pad without the need to connect the mobile phone to a separate charging connector. The wireless charging technology is currently being used for items such as a wireless electric toothbrush or a wireless electric shaver. Accordingly, a waterproof function is improved since electronic products are wirelessly charged through the wireless charging technology, and the portability of electronic devices is increased since there is no need to provide a wired charging apparatus. Technologies related to wireless charging technology are expected to be significantly developed in the coming age of electric cars.

Wireless charging technology includes an electromagnetic induction scheme using a coil, a resonance scheme using a resonance, and an RF/microwave radiation scheme converting electrical energy to a microwave energy and then transmitting the microwave energy.

A power transmission method through electromagnetic induction corresponds to a scheme of transmitting power between a first coil and a second coil. When a magnet approaches the coil, an induced current is generated. The transmission side generates a magnetic field by using the induced current and a reception side generates energy through an induced current according to changes in the magnetic field. This phenomenon is referred to as magnetic induction, and the power transmission method using magnetic induction has a high energy transmission efficiency.

With respect to the resonance scheme, a system has been developed in which electricity is wirelessly transferred using a power transmission principle of the resonance scheme based on a coupled mode theory even when a device to be charged is several meters from a charging device. A wireless charging system of an MIT team employs a concept in physics that the resonance is the tendency in which when a tuning fork oscillates at a particular frequency, a wine glass next to the tuning fork will oscillate at the same frequency. The research team resonated an electromagnetic wave containing electrical energy instead of resonating sound. The resonated electrical energy is transferred directly only when there is a device having a resonance frequency and parts of electrical energy which are not used are reabsorbed into an electromagnetic field instead of being spread in the air, so that the electrical energy does not affect surrounding machines or people unlike other electromagnetic waves.

According to a resonance scheme, the wireless power receiver includes a rectifying circuit for converting a received Alternating Current (AC) waveform to a Direct Current (DC) waveform and a DC-DC converting circuit for adjusting rectified power in the DC waveform to have a preset voltage value of an output terminal. However, it is difficult to implement the DC-DC converting circuit having a small mounting area while having a high output and efficiency since the DC-DC converting circuit necessarily uses a passive device having a large external parameter. Particularly, when the wireless power receiver is implemented as a mobile communication apparatus such as a mobile phone, an increase in the mounting area has a bad influence on making a device thin overall.

In addition, the DC-DC converting circuit is generally operated in a value less than or equal to than several MHz since the DC-DC converting circuit is an external packaged active device.

SUMMARY OF THE INVENTION

Accordingly, an aspect of the present invention is to solve the above-mentioned problems occurring in the prior art, and to provide a wireless power receiver for adjusting a size of received wireless power by controlling the wireless power by using a switch.

In accordance with an aspect of the present invention, a wireless power receiver for wirelessly receiving a supply of power from a wireless power supplier is provided. The wireless power receiver includes a power reception unit for wirelessly receiving wireless power from the wireless power supplier; a rectifier for rectifying the wireless power into power including a DC waveform; a power adjustor for configuring a closed loop with the power reception unit for a first period and transferring the wireless power to the rectifier for a second period to adjust a size of the wireless power; and a controller for determining the first period and the second period, wherein the power adjustor is electrically connected to the power reception unit and the rectifier.

In accordance with another aspect of the present invention, a control method by a wireless power receiver for wirelessly receiving a supply of power from a wireless power supplier is provided. The method includes receiving wireless power from the wireless power supplier; and controlling such that the wireless power is not output for a first period by configuring a closed loop within the wireless power receiver, and the wireless power is output and then rectified for a second period.

Embodiments of the present invention provide a wireless power receiver in which a size of received wireless power is adjusted by periodical short-circuiting and disconnection of a switch. Accordingly, it is possible to manufacture a smaller and lighter wireless power receiver as compared to a conventional DC-DC converting circuit, and significantly reduce a number of passive devices and integrated circuits. Further, it is possible to obtain stable DC output power through a resonant inductor and a capacitor as well as the switch.

Moreover, it is possible to provide more accurate and stable DC power by comparing synchronization signals of output power and wireless power received by a power reception unit, and controlling a switch.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1A:
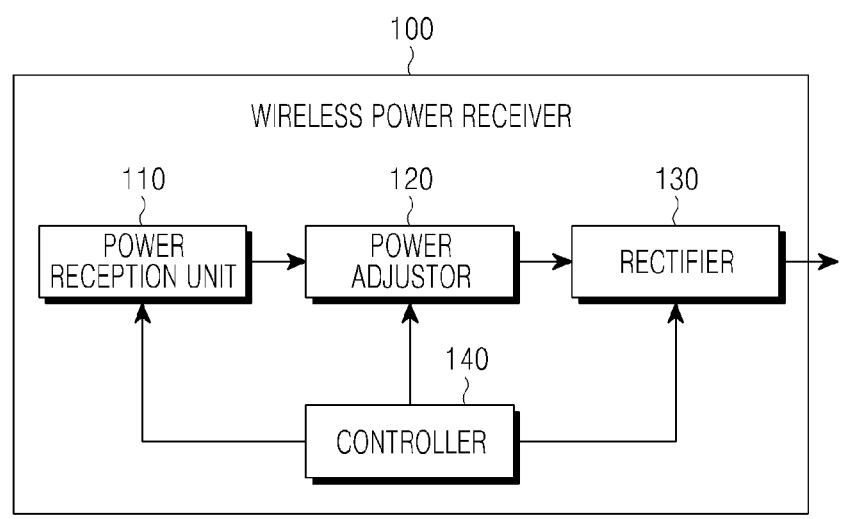
FIG. 1A is a block diagram illustrating a wireless power receiver according to an embodiment of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1A is a block diagram illustrating a wireless power receiver according to an embodiment of the present invention.

A wireless power receiver 100 includes a power reception unit 110, a power adjustor 120, a rectifier 130, and a controller 140.

The power reception unit 110 receives wireless power provided by a wireless power supplier. The wireless power receiver 100 according to embodiments of the present invention receives wireless power from the wireless power supplier based on a resonance technique, and accordingly is implemented as a loop coil having a predetermined inductance.

The power reception unit 110 receives wireless power output from the wireless power supplier through a resonance with an electromagnetic field. When the power reception unit 110 is implemented by using the loop coil, it is possible to change an inductance (L) of the loop coil, and thus it is possible to receive electromagnetic waves of various frequencies such as wireless power is. Further, a plurality of loop coils are used, and any means can be the loop coil so long as the loop coil is capable of receiving wireless power by resonating with an electromagnetic wave.

The power adjustor 120 receives an input of the wireless power received by the power reception unit 110 and adjusts a size of the wireless power. The power adjustor 120 adjusts the wireless power by adjusting one or more of a voltage and a current of the received wireless power. The power adjustor 120 adjusts the size of the wireless power by adjusting the voltage of the wireless power, and more particularly, reduces the size of the wireless power. The power adjustor 120 is electrically connected to each of the power reception unit 110 and the rectifier 130. The power adjustor 120 configures a closed loop with the power reception unit 110 for a first period. As the power reception unit 110 and the power adjustor 120 configure the closed loop for the first period, wireless power is not transmitted to the rectifier for the first period since the wireless power is moored to only the closed loop. The power adjustor 120 includes a storage means for storing the wireless power moored for the first period, and the storage means will be described later in more detail.

After the first period, the power adjustor 120 disconnects the closed loop for a second period and electrically connects the power reception unit 110 with the rectifier 130. Accordingly, the wireless power is transferred from the power reception unit 110 to the rectifier 130.

After the second period, the power adjustor 120 repeats an operation in which the power reception unit 110 and the rectifier 120 configure the closed loop and moor the wireless power to the closed loop for the first period and an operation in which the wireless power is transferred to the rectifier 130 for the second period.

According to the configuration described above, the wireless power is transferred to the rectifier 130 only for the second period without being transferred to the rectifier 130 for the first period, and thus a size of the wireless power transferred to the rectifier 130 is reduced. Specifically, a size of an average voltage of the wireless power is reduced. Such a process is illustrated in FIGS. 1B to 1D.

Figure 1B:
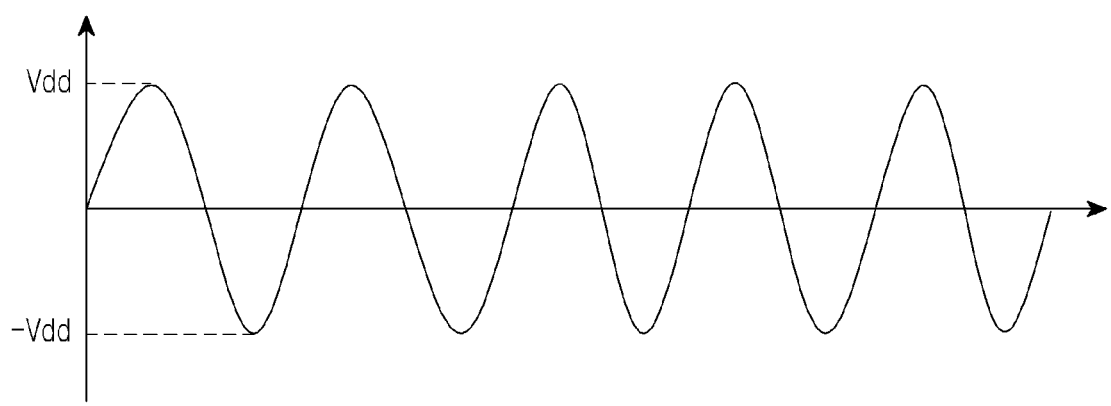
FIG. 1B illustrates a waveform of wireless power input to a power reception unit according to embodiments of the present invention.

FIG. 1B illustrates a waveform of wireless power input to the power reception unit according to embodiments of the present invention. As shown in FIG. 1B, the wireless power has a predetermined cycle and amplitude (Vdd).

Figure 1C:
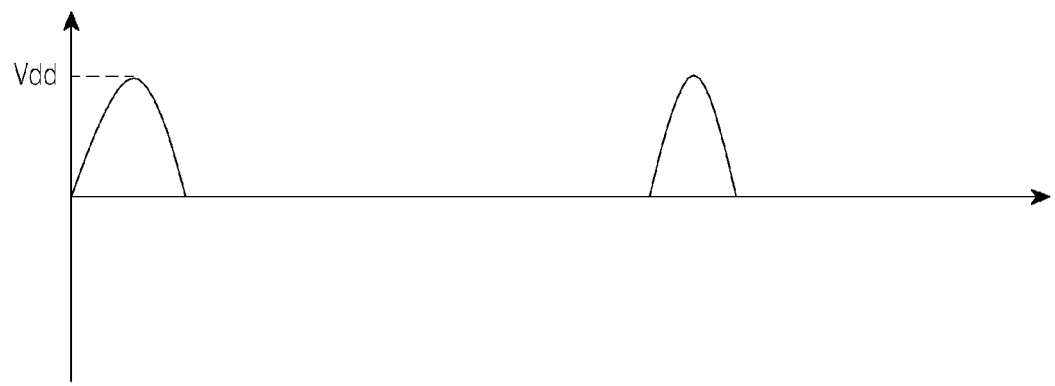
FIG. 1C illustrates a waveform adjusted by a power adjustor according to embodiments of the present invention.

FIG. 1C illustrates a waveform adjusted by the power adjustor 120 according to embodiments of the present invention. The first period corresponds to a period two and a half times longer than a cycle of the wireless power, and the second period corresponds to a period half as long as the cycle of the wireless power. As shown in FIG. 1C, adjusted wireless power is output only for the second period and is not output for the first period, that is, the two and a half times longer period.

Figure 1D:
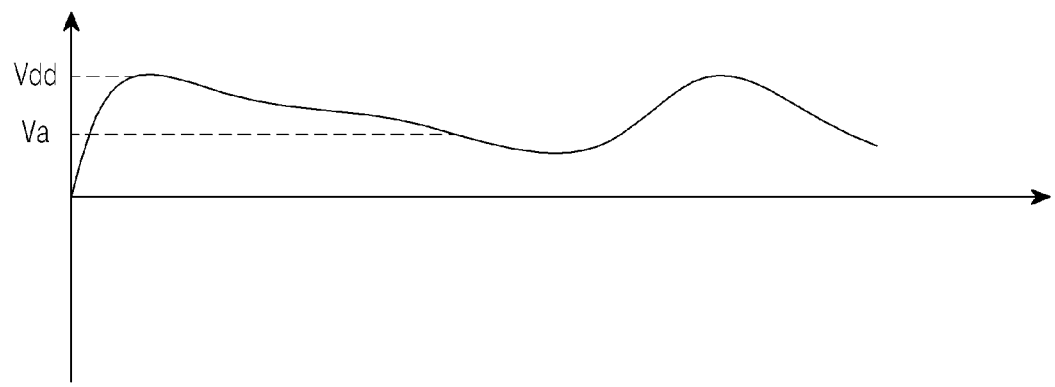
FIG. 1D illustrates a waveform of wireless power rectified by a rectifier according to embodiments of the present invention.

FIG. 1D illustrates a waveform of wireless power rectified by the rectifier 130 according to embodiments of the present invention. regarding a voltage, output wireless power is rectified and connected with one another, and thus shows the waveform illustrated in FIG. 1D. However, a size (Va) of an average voltage of the wireless power is reduced in comparison with the amplitude (Vdd) and an rms value. Accordingly, a size of a voltage of the rectified wireless power output from the rectifier 130 decreases more in comparison with a size of a voltage of initially received wireless power.

The controller 140 determines the first and second periods. As described with reference to FIGS. 1B to 1D, when a duration of the first period is increased, the wireless power moored to the closed loop is increased and thus a size of output wireless power is decreased. Accordingly, the size of the voltage of output rectified wireless power decreases further. Further, when the controller 140 decreases the duration of the first period, the wireless power moored to the closed loop is decreased and thus the size of the output wireless power is increased. The controller 140 controls the size of the output rectified wireless power according to the determination of the first and second periods. The controller 140 controls an overall operation of the wireless power receiver and is implemented as a microprocessor, a CPU, a small computer, etc.

The rectifier 130 rectifies the adjusted power received from the power adjustor 120. As described above, the adjusted power received from the power adjustor 120 has a waveform in which the power is output only for the second period and is not output for the first period, and the rectifier 130 outputs rectified wireless power having a DC waveform by connecting the output wireless power. The rectifier 130 is implemented using a known rectifying means, for example, a means such as a diode, and it is easily understood by those skilled in the art that the rectifier can be implemented by any means so long as the means is capable of performing the rectification.

As described above, the wireless power receiver controls such that the wireless power is output only for a predetermined period, that is, the second period, and implements a voltage drop of the wireless power by rectifying the output wireless power while not requiring a DC-DC converter. The power adjustor 120 includes only a power transmission control means so that it is possible to obtain an effect of reducing a total thickness and size of the wireless power receiver is obtained in contrast with the DC-DC converter.

Figure 2A:
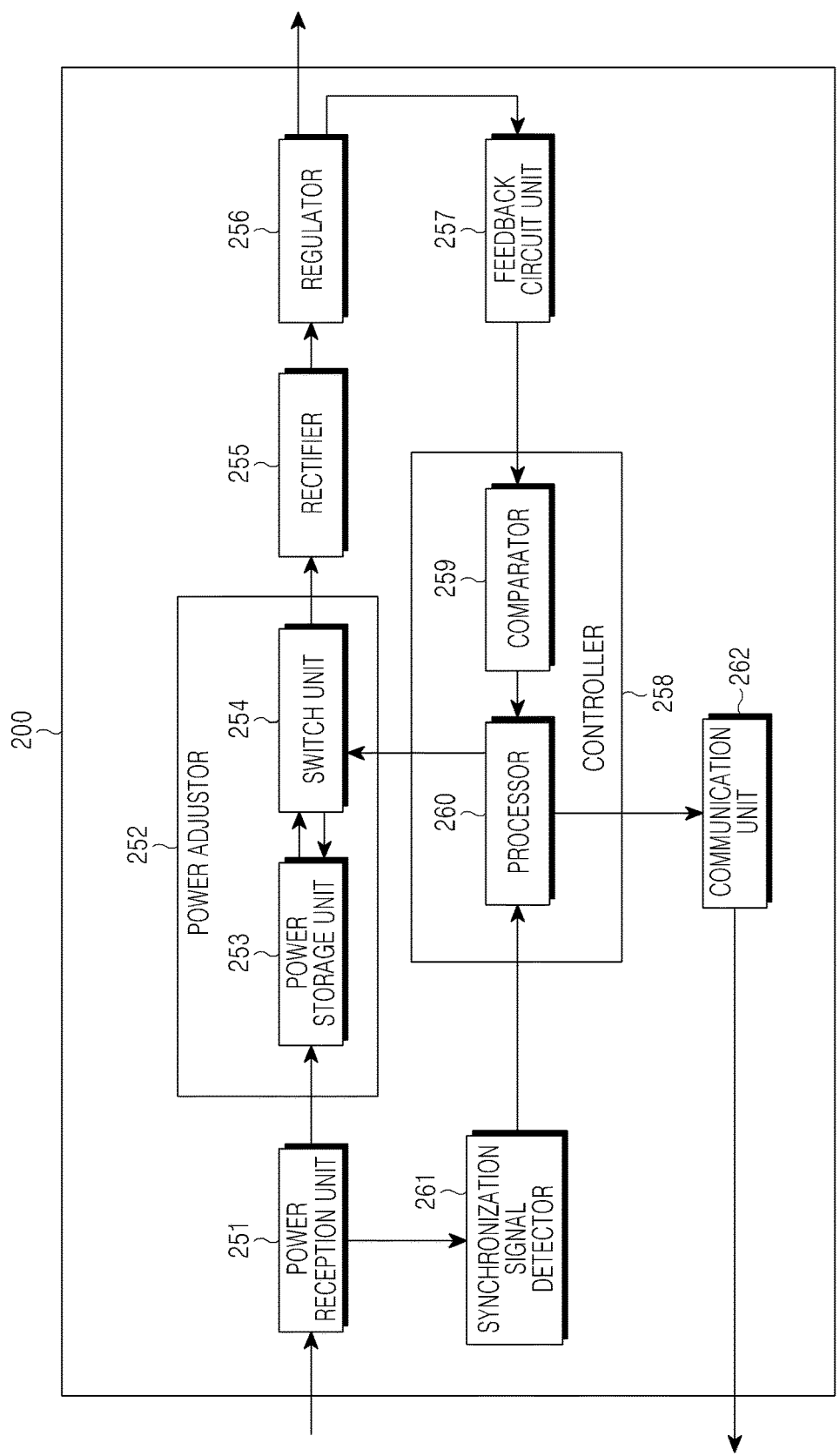
FIG. 2A is a block diagram illustrating a wireless power receiver according to an embodiment of the present invention.

FIG. 2A is a block diagram of a wireless power receiver according to an embodiment of the present invention.

A wireless power receiver 200 includes a power reception unit 251, a power adjustor 252, a rectifier 255, a regulator 256, a feedback circuit unit 257, a controller 258, a synchronization signal detector 261, and a communication unit 262. Further, the power adjustor 252 includes a power storage unit 253 and a switch unit 254, and a controller 258 includes a comparator 259 and a processor 260. Some elements in FIG. 2A having the same functions as those of the elements in FIG. 1A will be described briefly or their descriptions will be omitted.

The power adjustor 252 receives an input of wireless power from the power reception unit 251. The switch unit 254 included in the power adjustor 254 receives a control of the controller 258 and is disconnected for the first period, so that a closed loop is configured between the power reception unit 251 and the power storage unit 253 and the wireless power is stored in the power storage unit 253.

The switch unit 254 is disconnected for the second period, so that the wireless power is transferred to the rectifier 255. The switch is, for example, a free-wheeling switch. A detailed circuit diagram of the power adjustor 252 will be described later in more detail.

The switch unit 254 according to an embodiment of the present invention is implemented as an N type Metal-Oxide-Semiconductor Field-Effect Transistor (MOSFET). Further, the power storage unit 253 includes an inductor and a capacitance. More particularly, the power adjustor 252 is connected in series in an order of the inductor, the N type MOSFET, and the capacitance. The N type MOSFET receives an input of a control signal of the controller as a gate input terminal signal, and accordingly short-circuits for the first period and is disconnected for the second period. The wireless power is stored in an LC circuit including the inductor and the capacitance for the first period. A circuit construction related to the switch unit 254 will be described later in more detail.

The rectifier 255 receives an input of wireless power from the power adjustor 252 for the second period and outputs wireless power having a DC waveform by rectifying wireless power having an AC waveform as described with reference to FIG. 1A. Since the rectifier 255 receives the input of the wireless power only for the second period, a voltage of the output wireless power decreases more than the voltage of the initial wireless power.

The regulator 256 filters ripples from the rectified wireless power input from the rectifier 255 and then output the filtered power. The regulator 256 is implemented as an LC filter in an embodiment, and accordingly compensate for the rectified wireless power to be closer to an DC waveform. Further, the regulator 256 controls an output of the wireless power so that an overflow and the like are not generated when the wireless power is output through an output terminal. The wireless power output by the regulator 256 is output to an outside and then applied to a load, or stored in a storage (not shown) such as a battery.

The feedback circuit unit 257 feeds back the regulated wireless power output from the regulator 256 and output the fed back wireless power to the controller 258. The feedback circuit unit 257 is implemented by using, for example, a wire and a resistor in order to decrease a voltage for a current conduction.

The controller 258 controls the general operation of the wireless power receiver 200. Particularly, the controller 258 determines the first and second periods. As described with reference to FIGS. 1B to 1D, the voltage value of the rectified wireless power output from the rectifier is changed according to the duration of the first and second periods. The output voltage finally output from the regulator 256 should have a value of a preset voltage used in a load equipped with the wireless power receiver 200. Accordingly, the output voltage should maintain a predetermined value, and the controller 258 controls such that the output voltage maintains the preset voltage value through a control when the output voltage is increased or decreased in comparison with the preset voltage value.

The comparator 259 compares a voltage value of the fed back wireless power input from the feedback circuit unit 257 with a preset voltage value. The comparator 259 is implemented as, for example, a known comparator such as an OP-AMP and the like. The comparator 259 compares the fed back wireless power and the preset voltage value to determine which is larger, and a difference between them, and output a result of the comparison to the processor 260.

The processor 260 determines the first and second periods based on the result of the comparison performed by the comparator 259. For example, when the output voltage is larger than the preset voltage value as the result of the comparison, the processor 260 decreases the output voltage by increasing duration of the first period. However, when the output voltage is smaller than the preset voltage value as the result of the comparison, the processor 260 can increase the output voltage by increasing duration of the second period. The processor 260 generates a power adjusting signal for adjusting the power adjustor 252, particularly the switch unit 254 for the determined first and second periods and output the generated signal to the switch unit 254. For example, when the switch unit 254 is the N type MOSFET, the processor 260 generates a voltage applied to a gate of the N type MOSFET and apply the voltage to the N type MOSFET.

The synchronization signal detector 261 detects a synchronization signal from the power reception unit 251. The synchronization signal contains information on the cycle of the wireless power received from the power reception unit 251, and the synchronization signal detector 261 outputs the detected synchronization signal to the processor 260.

The processor 260 generates the power adjusting signal based on the synchronization signal. For example, the processor 260 receives an input of the synchronization signal having a wireless power frequency of 2.78 MHz, generate a clock of 2.78 MHz, and generate and output a power control signal in which a value of a part corresponding to a first period in the clock is set to "0".

The communication unit 262 performs communication with the wireless power supplier through a preset communication scheme. Meanwhile, the controller 258 generates a wireless power control signal for controlling supplied wireless power based on the fed back wireless power and output the generated signal to the communication unit 262. The communication unit 262 transmits the input wireless power control signal to a wireless communication supplier, and the wireless communication supplier controls the supplied wireless power based on the input wireless power control signal.

The wireless power control signal contains one or more of IDentification (ID) information of the wireless power receiver, information related to power reception, position information, environment setting information, information related to safety, and wireless power supplier control information. Further, the wireless power supplier control information contains one or more of an applied voltage of the wireless power supplier, a frequency of a power supply signal, and a duty cycle control information.

The wireless power supplier changes a size or an efficiency of the supplied wireless power by changing the applied voltage of the wireless power supplier, the frequency of the power supply signal, and the duty cycle based on the input wireless power control signal.

For example, when the output voltage is larger than the preset voltage value as the result of the comparison, the controller 258 generates a wireless power control signal for requesting to reduce power supply and controls such that the communication unit 262 transmits the wireless power control signal. When the wireless power supplier receives an input of the wireless power control signal for requesting to reduce the power supply, the power supply is reduced through an operation of reducing the applied voltage of the wireless power supplier.

Figure 2B:
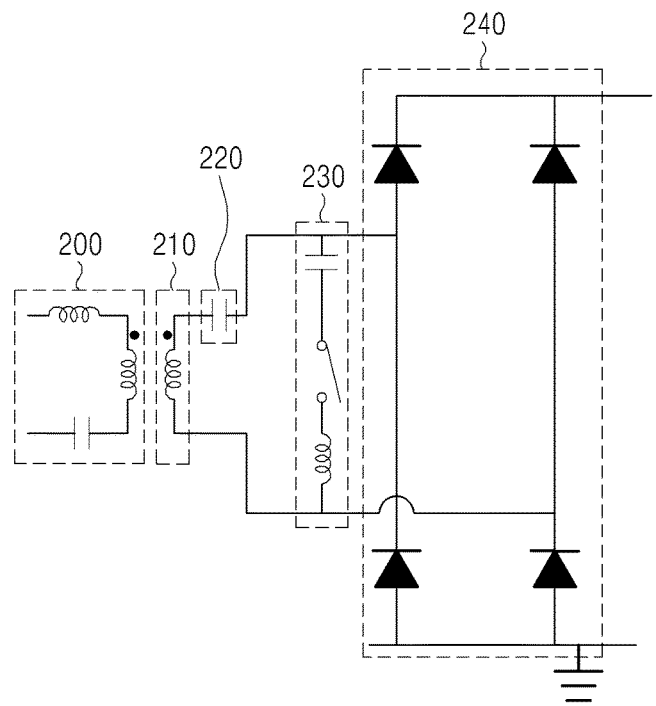
FIG. 2B is a circuit diagram illustrating a power supplier and a power receiver according to an embodiment of the present invention.

FIG. 2B is a circuit diagram illustrating a power supplier and a power receiver according to an embodiment of the present invention. The wireless power supplier 290 supplies wireless power.

The power reception unit 210 receives the wireless power from the wireless power supplier. As described above, the power reception unit 210 forms a resonance with an electromagnetic wave generated by the wireless power supplier 290 and receives the wireless power. The power reception unit 210 is implemented in a loop coil type as shown in FIG. 2B.

One end of the power reception unit 210 is connected to one end of a capacitor 220.

The capacitor 220 is a predetermined capacitance.

The other end of the capacitor 220 is connected to one end of the power adjustor 252 and the rectifier 240. The power adjustor 252 is implemented to have a construction in which the capacitor, the switch, and the coil are connected in series. As described above, the switch short-circuits for the first period, and accordingly the power reception unit 210, the capacitance 220, and a closed circuit including the capacitor and the coil is formed and the wireless power is stored in a series LC circuit.

The rectifier 240 is implemented as a known full-bridge diode. The switch is disconnected for the second period, and accordingly a wireless power transmission circuit connecting the power reception unit 210, the capacitor 220, and the rectifier 240 is formed.

Figure 3:
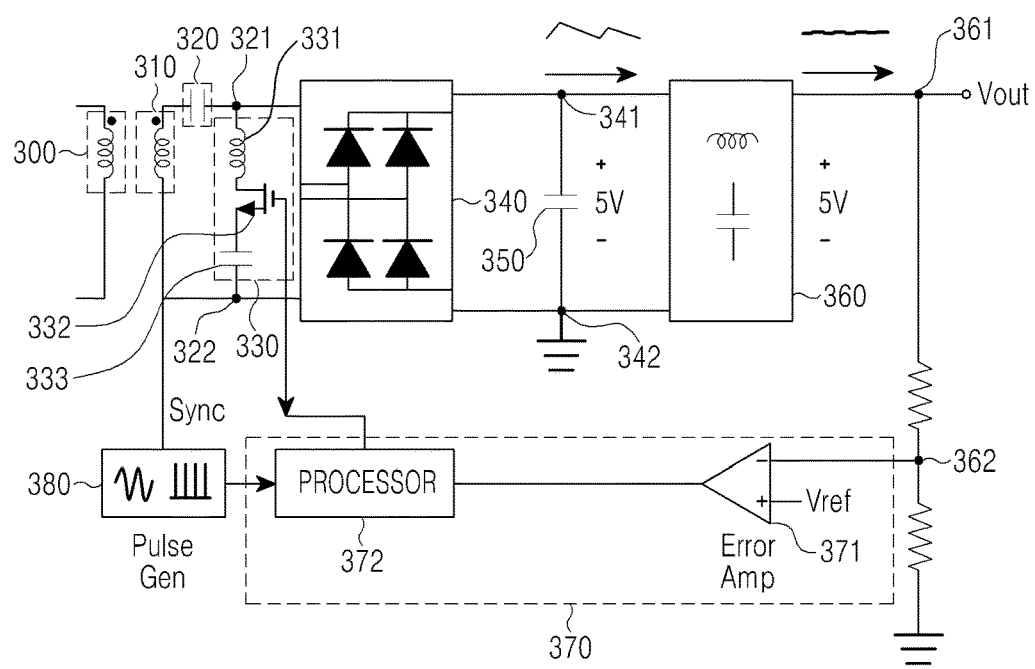
FIG. 3 is a circuit diagram illustrating a power receiver according to another embodiment of the present invention.

FIG. 3 is a circuit diagram of a power receiver according to another embodiment of the present invention. Descriptions of the same elements in the circuit diagram of FIG. 3 as those in FIG. 2B will be briefly discussed or omitted. FIG. 3 further includes a capacitor 350, a regulator 360, a controller 370, and a synchronization signal detector 380 in comparison with FIG. 2B.

A wireless power supplier 300 supplies wireless power.

One end of a power reception unit 310 is connected to one end of the capacitor 320.

The other end of the capacitor 320 is connected to one end of a power adjustor 330 and a rectifier 340. The power adjustor 330 includes a coil 331, an N type MOSFET 332, and a capacitor 333 connected in series. The other end of the capacitor 333, one end of which is connected to the N type MOSFET 332 is connected to a node 322, and the node 322 is connected to the other end of the power reception unit 310. The node 322 is connected to the rectifier 340 as well.

One end of the rectifier 340 is connected to a node 341, and the other end of the rectifier 340 is connected to a node 342. Both ends of a capacitor 350 are connected to the node 341 and the node 342, respectively, and thus the capacitor 350 is connected to the rectifier 340 in parallel. A preset voltage value, for example, 5V is applied to the capacitor 350.

The node 341 is connected to one end of the regulator 360, and the node 342 is connected to the other end of the regulator 360. The regulator 360 includes a coil and a capacitor. An output terminal of the regulator 360 is connected to a node 361, and thus connected to an output terminal of the circuit.

The node 361 is connected to a node, and there is a predetermined resistor between the node 361 and the node 362. A voltage drop is generated by the resistor, and the output voltage is fed back.

The controller 370 includes a comparator 371 and a processor 372. The comparator 371 is implemented as the OP-AMP. A first input terminal of the comparator 371 is connected to the node 362, and a second input terminal of the comparator 371 is connected to the preset Voltage (Vref). An output terminal of the comparator 371 is connected to the processor 372.

The processor is connected to the synchronization signal detector 380 as well and outputs the power adjusting signal generated according to the process described above to a gate input terminal of the N type MOSFET 332.

The synchronization signal detector 380 is connected to the other end of the power reception unit 310, and outputs the detected synchronization signal to the processor 372.

Figure 4A:
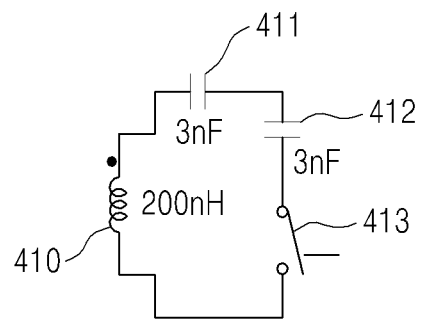
FIGS. 4A and 4B are circuit diagrams illustrating embodiments of a power adjustor.
Figure 4B:
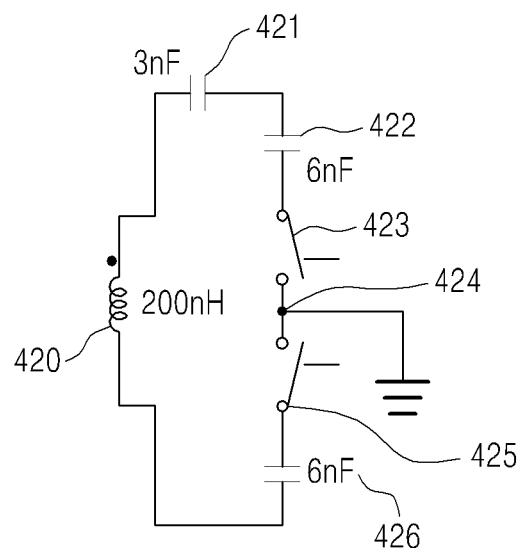

FIGS. 4A and 4B are circuit diagrams illustrating embodiments of a power adjustor.

A power adjustor of FIG. 4A includes a capacitor 412 and a switch 413. A power adjustor of FIG. 4B includes two capacitors 422 and 426 and two switches 423 and 425, and the power adjustor of FIG. 4A and the power adjustor of FIG. 4B are electrically equivalent.

One end of the power adjustor in FIG. 4B is connected to a capacitor 421, and the other end of the power adjustor in FIG. 4B is connected to one end of a switch 423. The other end of the switch 423 is connected to a node 424, and the node is grounded. The node 424 is also connected to one end of the a switch 425, and the other end of the switch 425 is connected to a capacitor 426. A capacitance of the capacitor 422 or 426 in FIG. 4B is two times of a capacitance of the capacitor 412 in FIG. 4A. The power adjustor having a parallel structure as shown in FIG. 4B has a low ESR.

Figure 5:
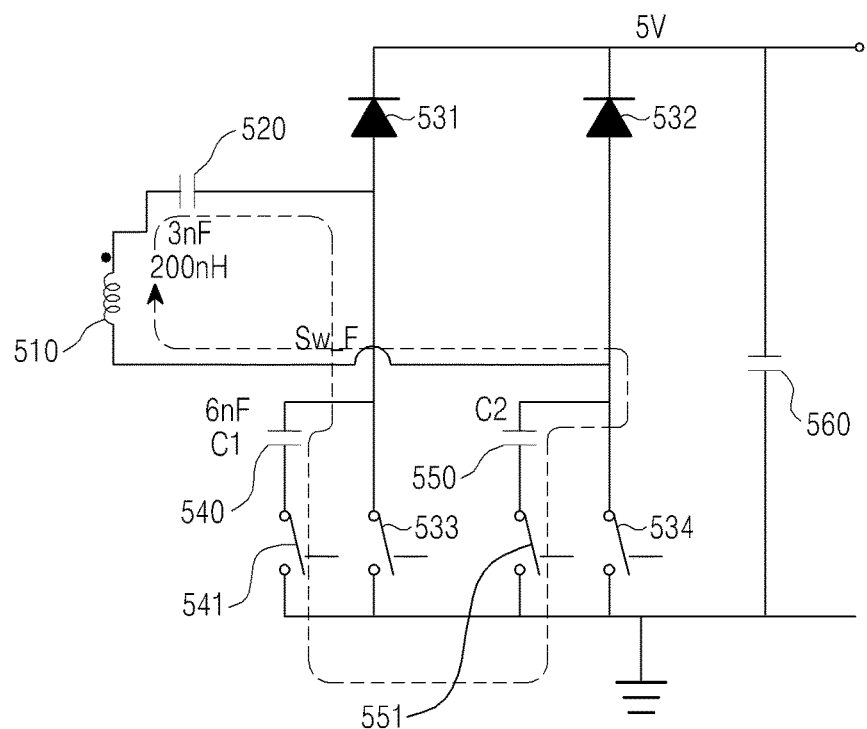
FIG. 5 is a circuit diagram illustrating a part of a wireless power receiver according to another embodiment of the present invention.

FIG. 5 is a circuit diagram of a part of a wireless power receiver according to another embodiment of the present invention. FIG. 5 adopts a power adjustor having the same parallel structure as that of FIG. 4B. Further, two low sides of a full-bridge diode has FET switches synchronized with each other, respectively. One end of a power reception unit 510 is connected to one end of a capacitor 520. An inductance of the power reception unit 510 may be, for example, 200 nH, and a capacitance of the capacitor 520 may be, for example, 3 nF. The other end of the capacitor 520 is connected to one end of a capacitor 540 and one end of a capacitor 550. Capacitances of the two capacitors 540 and 550 are, for example, 6 nF. The two capacitors 540 and 550 is connected to one end of a switch 541 and one end of a switch 551, respectively, and the other end of the switch 541 and the other end of the switch 551 is connected to the other end of the power reception unit 510.

The low side of the full-bridge diode has switches 533 and 544, not the diode. The short-circuit and disconnection of the switches 533 and 534 is synchronized. Further, the full-bridge diode includes diodes 531 and 532. A capacitor 560 is connected in parallel in the full-bridge diode.

Figure 6:
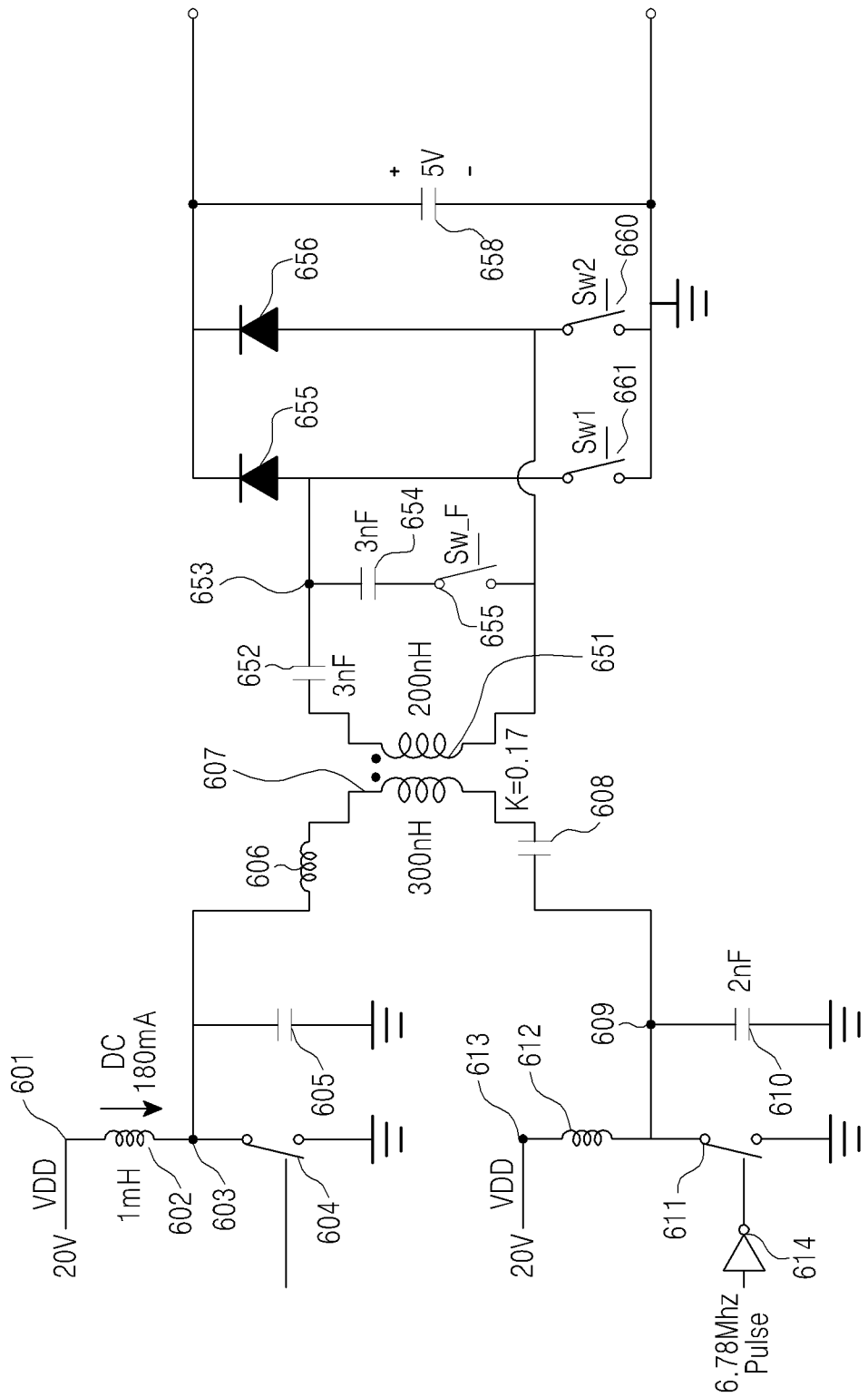
FIG. 6 is a circuit diagram illustrating a wireless power supplier and a wireless power receiver according to another embodiment of the present invention.

FIG. 6 is a circuit diagram of a wireless power supplier and a wireless power receiver according to another embodiment of the present invention.

A node 601 of a wireless power supplier receives an input of a DC voltage (VDD), for example, a voltage of 20 V from the outside. When the voltage of 20 V is applied, a current of, for example, 180 mA is conducted. The node 601 is connected to one end of a coil 602. An inductance of the coil 602 is, for example, 1 mH. The other end of the coil 602 is connected to a node 603. The node 603 is connected to one end of a switch 604. The switch 604 is connected to a ground. The node 603 is also connected to one end of a capacitor 605. The other end of the capacitor 605 is grounded. The node 603 is connected to one end of a coil 606. The other end of the coil 606 is connected to one end of a coil 607. An inductance of the coil 607 may be, for example, 300 nH, and a coupling coefficient between the coil 607 and a coil of a power reception unit 651 may be, for example, 0.17. The other end of the coil 607 is connected to one end of a capacitor 608. The other end of the capacitor 608 is connected to a node 609. The node 609 is connected to one end of a capacitor 610. A capacitance of the capacitor 610 may be, for example, 2 nF. The other end of the capacitor 610 is grounded. The node 609 is also connected to a switch 611. The switch 611 is grounded, or connected to an input terminal 614 of a pulse of 6.7 MHz. The node 609 is also connected to one end of a coil 612. An inductance of the coil 612 is, for example, 1 mH. The other end of the coil 612 is connected to a node 613, and a DC voltage (VDD) of, for example, 20 V is applied to the node 613.

One end of the power reception unit 651 is connected to one end of a capacitor 652. An inductance of the power reception unit 651 may be, for example, 200 nH, and a capacitance of the capacitor 652 may be, for example, 3 nF. The other end of the capacitor 652 is connected to one end of a capacitor 654. A capacitance of the capacitor 654 may be, for example, 3 nF. The capacitance is connected to one end of a switch 655, and the other end of the switch 655 is connected to the other end of the power reception unit 651.

A low side of a full-bridge diode includes switches 661 and 660, not a diode. The short-circuiting and disconnection of the switches 661 and 660 is synchronized. Further, the full-bridge diode includes diodes 655 and 656. A capacitor 658 is connected in parallel in the full-bridge diode.

Figure 7:
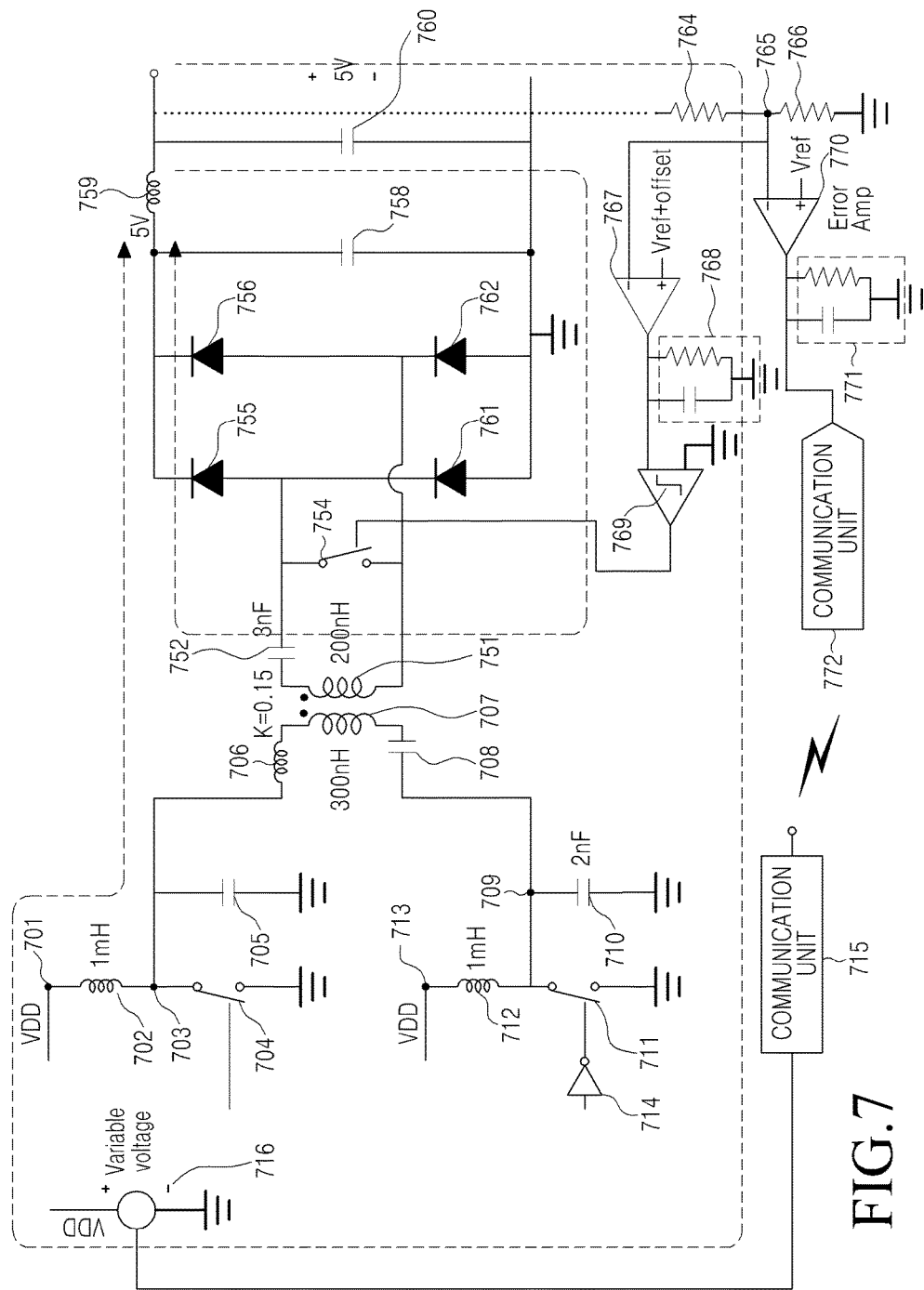
FIG. 7 is a circuit diagram illustrating a wireless power supplier and a wireless power receiver according to yet another embodiment of the present invention.

FIG. 7 is a circuit diagram illustrating a wireless power supplier and a wireless power receiver according to yet another embodiment of the present invention.

A node 701 of a wireless power supplier receives a DC voltage (VDD), for example, a voltage of 20 V from the outside. When the voltage of 20 V is applied, a current of, for example, 180 mA is conducted. The node 701 is connected to one end of a coil 702.

An inductance of the coil 702 may be, for example, 1 mH. The other end of the coil 702 is connected to a node 703. The node 703 is connected to one end of a switch 704. The switch 704 is connected to a ground. The node 703 is also connected to one end of a capacitor 705. The other end of the capacitor 705 is grounded. The node 703 is connected to one end of a coil 706. The other end of the coil 706 is connected to one end of a coil 707.

An inductance of the coil 707 is, for example, 300 nH, and a coupling coefficient between the coil 707 and a coil of a power reception unit 751 is, for example, 0.15. The other end of the coil 707 is connected to one end of a capacitor 708. The other end of the capacitor 708 is connected to a node 709. The node 709 is connected to one end of a capacitor 710.

A capacitance of the capacitor 710 is, for example, 2 nF. The other end of the capacitor 710 is grounded. The node 709 is also connected to a switch 711. The switch 711 is grounded, or connected to, for example, an input terminal 714 with a pulse of 6.78 MHz. The node 709 is also connected to one end of a coil 712. An inductance of the coil 712 is, 1 Hm. The other end of the coil 712 is connected to a node 713. For example, a DC voltage (VDD) of 20 V is applied to the node 713.

One end of the power reception unit 751 is connected to one end of a capacitor 752. An inductance of the power reception unit 751 is, for example, 200 nH, and a capacitance of a capacitor 752 may be, for example, 3 nF. The capacitor 752 is connected to one end of a switch 754, and the other end of the switch 754 is connected to the other end of the power reception unit 751.

Further, a full-bridge diode includes diodes 755, 756, 761, and 762.

A capacitor 758 is connected in parallel in the full-bridge diode.

An output terminal of the full-bridge diode is connected to one end of a coil 759. The other end of the coil 759 is connected to an output terminal, or connected to one end of a capacitor 760. The other end of the capacitor 760 is grounded.

An output terminal is further connected to one end of a resistor 764 through a wire indicated by a dot line. The other end of the resistor 764 is connected to a node 765. The node 765 is connected to one end of a resistor 766, the other end of which is grounded. The node 765 is connected to a first input terminal of a comparator 770. Further, the node 765 is also connected to a first input terminal of a comparator 767. A preset voltage value is applied to a second input terminal of the comparator 770, and an output terminal of the comparator 770 is connected to an LC circuit. The output terminal of the comparator 770 is also connected to a communication unit 772.

A voltage generated by adding the preset voltage value to an offset voltage value is applied to a second input terminal of the comparator 767. Further, the output terminal of the comparator 767 is connected to the LC circuit, and the output terminal of the comparator 767 is connected to a first input terminal of a comparator 769. A second input terminal of the comparator 769 is grounded, and an output terminal of the comparator 769 is connected to the switch 754.

A communication unit 715 receives an input of a power control signal from the communication unit 772, and changes a voltage (VDD) applied from a power provider 716 based on the input power control signal.

Figure 8:
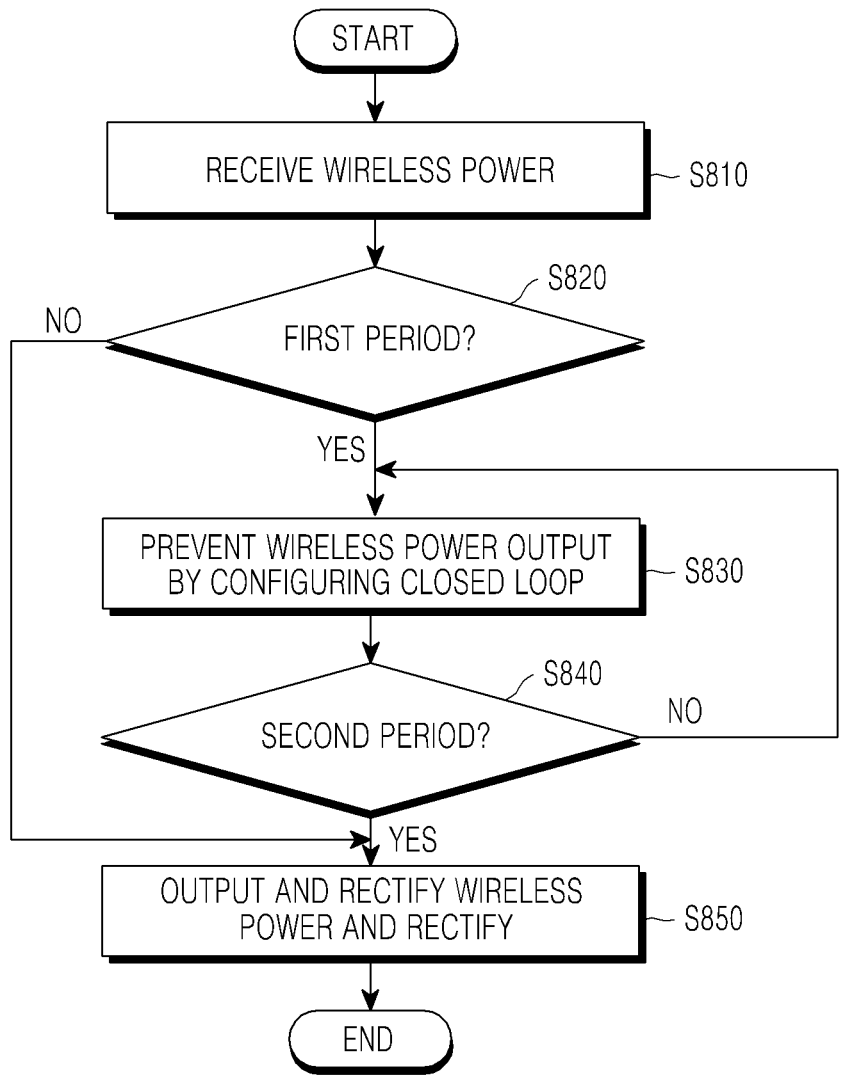
FIG. 8 is a flowchart illustrating a control method of a wireless power receiver according to another embodiment of the present invention.

FIG. 8 is a flowchart illustrating a control method of a wireless power receiver according to another embodiment of the present invention.

A wireless power receiver receives wireless power from a wireless power supplier in step S810. Since the description in connection with a method of receiving wireless power has been already provided in detail, it will be omitted herein.

The wireless power receiver may not output wireless power for a first period (corresponding to step S820-Y) by configuring a closed loop within the wireless power receiver in step S830. Further, the wireless power receiver controls such that the wireless power is output and rectified for a second period (corresponding to step S840-Y) in step S850.

The control method by the wireless power receiver further include a step of feeding back the rectified wireless power and then analyzing the fed back power. In this event, the first and second periods are determined based on the fed back wireless power.

The first and second periods is determined by a result of a comparison between a voltage value of the fed back wireless power and a preset comparative voltage value, and the wireless power receiver controls an operation for the first and second periods by generating a power adjusting signal for controlling the wireless power receiver for the first and second periods, respectively.

The control method by the wireless power receiver further includes a step of detecting a synchronization signal for a synchronization with the power adjusting signal from the wireless power received by a power reception unit. In this event, the power adjusting signal is generated based on the synchronization signal in a step of generating and outputting the power adjusting signal.

In the step of generating and outputting the power adjusting signal, a wireless power control signal for a control of the wireless power is generated based on the fed back wireless power. In this case, the control method by the wireless power receiver further includes a step of transmitting the wireless power control signal to the wireless power supplier. In this case, the wireless power control signal contains one or more of identifier (ID) information of the wireless power receiver, information related to power reception, position information, environment setting information, information related to safety, and wireless power supplier control information, and particularly the wireless power supplier control information contains one or more of an applied voltage of the wireless power supplier, a frequency of a power supply signal, and duty cycle control information.

The control method by the wireless power receiver further includes a step of filtering ripples from the rectified wireless power and outputting the filtered power.

While the invention has been shown and described with reference to certain embodiments thereof, it will be understood by those skilled in the art that various changes in form and details is made therein without departing from the spirit and scope of the invention as defined by the appended claims and their equivalents.

What is claimed is:

1. A wireless power receiver for wirelessly receiving power from a wireless power supplier, the wireless power receiver comprising:
   a power reception unit configured to wirelessly receive the power from the wireless power supplier;
   a rectifier configured to rectify the received power into DC power;
   a power adjustor configured to disconnect the power reception unit from the rectifier for a first period and to connect the power reception unit to the rectifier for transferring the received power to the rectifier for a second period to adjust a size of the received power to be transferred to the rectifier; and
   a controller configured to:
      determine whether to increase or decrease the size of the received power to be transferred to the rectifier, and
      in response to the size of the received power being transferred to the rectifier being determined to be increased, increase a duration of the second period,
   wherein the power adjustor is electrically connected to the power reception unit and the rectifier,
   wherein the size of the received power to be transferred to the rectifier is adjusted according to a ratio of a duration of the first period to the duration of the second period, and
   wherein the received power is not transferred from the power reception unit to the rectifier during the first period.

2. The wireless power receiver of claim 1, wherein the power adjustor comprises:
   a power storage unit configured to store the received power for the first period; and
   a switch unit configured to connect the power reception unit and the power storage unit through short-circuiting for the first period and to connect the power reception unit and the rectifier through disconnection for the second period,
   wherein the power storage unit is connected to the power reception unit in series.

3. The wireless power receiver of claim 2, wherein the power storage unit comprises an inductor and a capacitor connected in series.

4. The wireless power receiver of claim 2, wherein the switch unit is an N type MOSFET device, and the controller adjusts a voltage applied to a gate of the N type MOSFET device to determine the first period and the second period.

5. The wireless power receiver of claim 1, further comprising:
a feedback circuit unit configured to feed back the rectified power and transfer the fed back power to the controller,
wherein the controller is configured to determine the first period and the second period based on the fed back power.

6. The wireless power receiver of claim 5, wherein the controller comprises:
a comparator configured to compare a voltage value of the fed back power with a preset comparative voltage value; and
a processor configured to determine the first period and the second period based on a result of the comparison performed by the comparator, and to generate a power adjusting signal for controlling an operation of the power adjustor.

7. The wireless power receiver of claim 6, further comprising:
a synchronization signal detector configured to detect a synchronization signal for a synchronization with the power adjusting signal from the power received by the power reception unit,
wherein the controller is configured to generate the power adjusting signal based on the synchronization signal.

8. The wireless power receiver of claim 5, further comprising:
a communication unit configured to communicate with the wireless power supplier through a preset communication scheme,
wherein the controller is configured to generate a wireless power control signal for controlling the power based on the fed back power, and to control such that the communication unit transmits the wireless power control signal to the wireless power supplier.

9. The wireless power receiver of claim 8, wherein the wireless power control signal includes one or more of IDentifier (ID) information of the wireless power receiver, information related to power reception, position information, environment setting information, information related to safety, and control information of the wireless power supplier.

10. The wireless power receiver of claim 9, wherein the control information of the wireless power supplier contains one or more of an applied voltage of the wireless power supplier, a frequency of a power supply signal, and duty cycle control information.

11. The wireless power receiver of claim 1, further comprising a regulator configured to filter ripples from the rectified power and output the filtered power.

12. The wireless power receiver of claim 1, wherein the rectifier is a full-bridge diode.

13. The wireless power receiver of claim 12, wherein two low sides of the full-bridge diode comprise FET switches synchronized with one another, respectively.

14. The wireless power receiver of claim 1, wherein the power adjustor comprises:
a first capacitor, one end of which is connected to the power reception unit;
a first switch connected to an other end of the first capacitor, short-circuited for the first period, and disconnected for the second period;
a ground connected to the first switch;
a second switch connected to the ground, short-circuited for the first period, and disconnected for the second period; and
a second capacitor, one end of which is connected to the second switch.

15. A control method by a wireless power receiver for wirelessly receiving a supply of power from a wireless power supplier, the method comprising:
receiving power wirelessly from the wireless power supplier;
determining whether to increase or decrease a size of the received power to be transferred to a rectifier of the wireless power receiver;
in response to the size of the received power being transferred to the rectifier being determined to be increased, increasing a duration of the second period;
controlling such that the power is not output for the first period by configuring a closed loop within the wireless power receiver, and the power is output to the rectifier for the second period,
wherein a size of the power to be transferred to the rectifier is adjusted according to a ratio of a duration of the first period to the duration of the second period.

16. The control method of claim 15, further comprising:
feeding back the rectified power and analyzing the fed back power,
wherein the first period and the second period are determined based on the fed back power.

17. The control method of claim 16, further comprising:
generating and outputting a power adjusting signal for controlling the wireless power receiver for the first period and the second period,
wherein the first period and the second period are determined by a result of a comparison between a voltage value of the fed back power and a preset comparative voltage value.

18. The control method of claim 17, further comprising:
detecting a synchronization signal for a synchronization with the power adjusting signal from the power received by the power reception unit,
wherein generating and outputting the power adjusting signal comprises generating the power adjusting signal based on the synchronization signal.

19. The control method of claim 17, wherein generating and outputting the power adjusting signal comprises generating a wireless power control signal for a control of the power based on the fed back power, and transmitting the wireless power control signal to the wireless power supplier.

20. The control method of claim 19, wherein the wireless power control signal contains one or more of IDentifier (ID) information of the wireless power receiver, information related to power reception, position information, environment setting information, information related to safety, and control information on the wireless power supplier.

21. The control method of claim 20, wherein the control information of the wireless power supplier contains one or more of an applied voltage of the wireless power supplier, a frequency of a power supply signal, and duty cycle control information.

22. A wireless power receiver for wirelessly receiving power from a wireless power supplier, the wireless power receiver comprising:
a power reception unit configured to wirelessly receive the power from the wireless power supplier;
a rectifier configured to rectify the received power into DC power;

a power adjustor configured to disconnect the power reception unit from the rectifier for a first period and to connect the power reception unit to the rectifier for transferring the received power to the rectifier for a second period to adjust a size of the received power to be transferred to the rectifier; and a controller configured to:
  determine whether to increase or decrease the size of the received power to be transferred to the rectifier, and
  in response to the size of the received power being transferred to the rectifier being determined to be decreased, decrease a duration of the second period, wherein the power adjustor is electrically connected to the power reception unit and the rectifier, wherein the size of the received power to be transferred to the rectifier is adjusted according to a ratio of a duration of the first period to the duration of the second period, and wherein the received power is not transferred from the power reception unit to the rectifier during the first period.

* * * * *